(12) United States Patent
Lindsay et al.

(10) Patent No.: US 7,151,455 B2
(45) Date of Patent: Dec. 19, 2006

(54) ACTIVATING A DATA TAG BY LOAD OR ORIENTATION OR USER CONTROL

(75) Inventors: Jeffrey Dean Lindsay, Appleton, WI (US); Heriberto Flores Velazquez, Neenah, WI (US); Fung-jou Chen, Appleton, WI (US); Eric Francis Wagner, Sherwood, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 264 days.

(21) Appl. No.: 10/836,023

(22) Filed: Apr. 30, 2004

(65) Prior Publication Data

US 2005/0242950 A1    Nov. 3, 2005

(51) Int. Cl.
*G08B 13/14* (2006.01)
(52) U.S. Cl. ............... 340/572.3; 340/539.26; 340/572.7; 340/593; 340/602; 340/666
(58) Field of Classification Search ......... 340/572.3, 340/572.7, 539.26, 666, 584, 593, 594, 601, 340/602, 689; 200/61.45 R, 61.52; 374/187, 374/188
See application file for complete search history.

(56) References Cited

U.S. PATENT DOCUMENTS

| | | | |
|---|---|---|---|
| 4,442,507 A | 4/1984 | Roesner | |
| 4,796,074 A | 1/1989 | Roesner | |
| 5,095,362 A | 3/1992 | Roesner | |
| 5,296,722 A | 3/1994 | Potash et al. | |
| 5,347,274 A * | 9/1994 | Hassett | 340/988 |
| 5,347,280 A | 9/1994 | Schuermann | |
| 5,360,941 A | 11/1994 | Roes | |
| 5,378,880 A | 1/1995 | Eberhardt | |
| 5,407,851 A | 4/1995 | Roesner | |
| 5,461,385 A * | 10/1995 | Armstrong | 340/447 |
| 5,521,601 A | 5/1996 | Kandlur et al. | |
| 5,528,222 A | 6/1996 | Moskowitz et al. | |
| 5,541,604 A | 7/1996 | Meier | |
| 5,550,547 A | 8/1996 | Chan et al. | |
| 5,565,846 A | 10/1996 | Geiszler et al. | |
| 5,625,341 A | 4/1997 | Giles et al. | |
| 5,682,143 A | 10/1997 | Brady et al. | |
| 5,764,138 A * | 6/1998 | Lowe | 340/447 |
| 5,798,694 A | 8/1998 | Reber et al. | |
| 5,990,794 A | 11/1999 | Alicot et al. | |
| 6,069,564 A | 5/2000 | Hatano et al. | |

(Continued)

FOREIGN PATENT DOCUMENTS

DE    19530823 A1    2/1997

(Continued)

OTHER PUBLICATIONS

Ashton, Kevin, "Embedding the Internet in Everyday Products", The X Internet: The Next Voyage available at http://www.forrester.com/Events/Speech/0,5179,309-783-aios,00.html, Nov. 2001, 2 pages, Forrester Research, Inc., USA.

(Continued)

*Primary Examiner*—Thomas Mullen
(74) *Attorney, Agent, or Firm*—Senniger Powers

(57) ABSTRACT

Mechanically and reversibly activating or deactivating a radio frequency identification (RFID) data tag. An RFID tag includes an RFID chip for storing an RFID code, an antenna for communicating a radio frequency (RF) signal, and a mechanical switch coupling the RFID chip to the antenna. Closing the mechanical switch enables the RFID chip and the antenna to communicate the RFID code via the RF signal.

21 Claims, 4 Drawing Sheets

U.S. PATENT DOCUMENTS

| | | | |
|---|---|---|---|
| 6,084,530 | A | 7/2000 | Pidwerbetsky et al. |
| 6,094,173 | A | 7/2000 | Nylander |
| 6,121,544 | A | 9/2000 | Petsinger |
| 6,169,483 | B1 | 1/2001 | Ghaffari et al. |
| 6,176,425 | B1 | 1/2001 | Harrison et al. |
| 6,285,282 | B1* | 9/2001 | Dorenbosch et al. ..... 340/572.1 |
| 6,294,997 | B1 | 9/2001 | Paratore et al. |
| 6,340,932 | B1 | 1/2002 | Rodgers |
| 6,342,830 | B1* | 1/2002 | Want et al. ............. 340/572.7 |
| 6,456,239 | B1 | 9/2002 | Werb et al. |
| 6,507,279 | B1 | 1/2003 | Loof |
| 6,600,418 | B1 | 7/2003 | Francis et al. |
| 6,661,335 | B1 | 12/2003 | Seal |
| 6,662,642 | B1 | 12/2003 | Breed et al. |
| 6,672,512 | B1 | 1/2004 | Bridgelall |
| 6,680,702 | B1 | 1/2004 | Yde-Andersen et al. |
| 6,693,538 | B1 | 2/2004 | Maloney |
| 6,696,954 | B1 | 2/2004 | Chung |
| 6,703,935 | B1 | 3/2004 | Chung et al. |
| 6,714,121 | B1 | 3/2004 | Moore |
| 7,009,517 | B1* | 3/2006 | Wood .................... 340/539.26 |
| 2002/0067264 | A1 | 6/2002 | Soehnien |
| 2002/0067267 | A1 | 6/2002 | Kirkham |
| 2002/0109636 | A1 | 8/2002 | Johnson et al. |
| 2002/0152605 | A1 | 10/2002 | Debraal |
| 2002/0161652 | A1* | 10/2002 | Paullin et al. ................ 705/22 |
| 2003/0031819 | A1 | 2/2003 | Adams et al. |
| 2003/0090388 | A1 | 5/2003 | Pomes |
| 2003/0099158 | A1 | 5/2003 | De la Huerga |
| 2003/0111540 | A1 | 6/2003 | Hartmann |
| 2003/0116634 | A1 | 6/2003 | Tanaka |
| 2003/0122655 | A1 | 7/2003 | Hum et al. |
| 2004/0001568 | A1 | 1/2004 | Impson et al. |
| 2004/0036595 | A1 | 2/2004 | Kenny et al. |
| 2004/0041709 | A1* | 3/2004 | Forster ...................... 340/603 |
| 2004/0049428 | A1 | 3/2004 | Soehnlen et al. |
| 2004/0058453 | A1 | 3/2004 | Free et al. |
| 2004/0060976 | A1 | 4/2004 | Blazey et al. |
| 2004/0066296 | A1 | 4/2004 | Atherton |
| 2005/0171738 | A1* | 8/2005 | Kadaba ...................... 702/187 |

FOREIGN PATENT DOCUMENTS

| | | |
|---|---|---|
| EP | 0 478 092 B1 | 4/1992 |
| EP | 0 574 399 B1 | 12/1993 |
| EP | 0 598 624 B1 | 5/1994 |
| EP | 0 615 285 A2 | 9/1994 |
| EP | 0 494 114 B1 | 11/1996 |
| EP | 0 786 749 A1 | 7/1997 |
| EP | 0 585 132 B1 | 9/1998 |
| EP | 1 225 585 A1 | 7/2002 |
| EP | 1 326 219 A2 | 7/2003 |
| EP | 1 339 032 A2 | 8/2003 |
| FR | 2392451 A | 12/1978 |
| WO | WO 99/05660 A1 | 2/1999 |
| WO | WO 01/69516 A2 | 9/2001 |
| WO | WO 01/69524 A2 | 9/2001 |
| WO | WO 01/69525 A1 | 9/2001 |
| WO | WO 01/80174 A1 | 10/2001 |
| WO | WO 02/21424 A2 | 3/2002 |
| WO | WO 02/077939 A1 | 10/2002 |
| WO | WO 02/086910 A2 | 10/2002 |
| WO | WO 03/044892 A1 | 5/2003 |
| WO | WO 03/061060 A2 | 7/2003 |
| WO | WO 2004/023391 A1 | 3/2004 |
| WO | WO 2005/008578 A | 1/2005 |

OTHER PUBLICATIONS

Brock, David L., "Integrating the Electronic Product Code (EPC) and the Global Trade Item Number (GTIN)", White Paper available at www.autoidcenter.org/pdfs/MIT-WUTOID-WH-004.pdf, Nov. 1, 2001, 25 pages, MIT AUTO-ID Center, Massachusetts Institute of Technology, Cambridge, MA, USA.

"Combating Counterfeit Drugs: A Report of the Food and Drug Administration", Feb. 2004, http://www.fda.gov/oc/counterfeit/report02_04.html, 37 pages, The United States Department of Health and Human Services, U.S. Food and Drug Administration, USA.

"FDA's Counterfeit Drug Task Force Interim Report" available at http://www.fda.gov/oc/initiatives/counterfeit/report/interm_report.html, Oct. 2003, 27 pages, The United States Department of Health and Human Services, U.S. Food and Drug Administration, USA.

Hannibal, "Opt-out Feature for RFID Tags", available at http://arstechnica.com/news/posts/1052194426.html, May 5, 2003, 3 pages, Ars Technica, LLC, USA.

"IST-2000-29551 SIDCOM", "Network on Sensing, Identification and Data Communications with Passive Non-Contact Technologies" available at www.fuse-network.com/sidcom/eurosid/demonstration/projects/fl_04.pdf, 4 pages, accessed Jun. 2004, PAV CARD GmbH, Institut Für Angewandte Microelektronik Forschungs-und Entwicklungs GmbH, Germany.

Losefsky, Pam, "It's Here—Alien Technology", The McCombs School of Business Magazine, 2001, 3 pages, University of Texas, USA.

"Mikoh Coporation Adopts Tag-It™ RFID Smart Label Inlays From Texas Instruments", available at http://www.ti.com/tiris/docs/news/news_releases/2000/rel07-13-00.shtml, Jul. 13, 2000, 4 pages, Texas Instruments Inc., USA.

"Pervasive Computing Goes the Last Hundred Feet . . . ", available at http://dsonline.computer.org/0306/d/b2app3.htm, accessed Jun. 10, 2004, 3 pages, Institute of Electrical and Electronics Engineers, Inc., USA.

"Protection of Personal Property Via Radio Frequence Identifiers", Apr. 28, 2004, published at IP.com as Document ID 000028146, 2 pages, USA.

"RFID May Reduce Electricity Theft", available at http://www.rfidjournal.com/article/articleview/56/1/1/, Aug. 20, 2002, 2 pages, RFID Journal, Inc., USA.

"RFID Medicine Tracking", available at http://www.yenra.com/rfid-medicine-tracking/, Jul. 18, 2003, 2 pages, Yenra, USA.

Sarma, Sanjay, "Towards the 5¢ Tag", Nov. 1, 2001, 19 pages, MIT AUTO-ID Center, Massachusetts Institute of Technology, Cambridge, MA, USA.

Schoenberger, Chana R., "The Internet of Things; Chips at the Checkout Counter", Forbes Magazine, Mar. 18, 2002, vol. 169, Issue 5, 3 pages, Forbes, USA.

Starkman, Dean, "International Paper and Motorola Agree to Put Microchips in 'Smart Packages'", Wall Street Journal, Apr. 13, 2000, 2 pages, The Wall Street Journal, USA.

Vanscoy, Kayte, "They Know What You Eat", Smart Business, 2001, 2 pages, Mindfully.org, USA.

"Variety and Versatility in a Coil . . . and More", available at http://www.rcdtechnology.com/application.html, 2001-2002, 2 pages, RCD Technology, Inc., USA.

Witt, Clyde E., "Packaging Meets RFID—Finally", Material Handling Management, Abstract, Jun. 2000, 3 pages, vol. 55, Issue 6, USA.

* cited by examiner

Orientation-sensitive RFID chip cylinder 302

Fluid in cylinder 306

RFID chip 304

RF Shielding 308

Axis of chip motion 310

First antenna (on cap) 404

Conductive leads 406

Circuit with transistor 412

First RFID chip 402

Second RFID chip 408

Second antenna 410

ACTIVATING A DATA TAG BY LOAD OR ORIENTATION OR USER CONTROL

FIELD OF THE INVENTION

Embodiments of the invention generally relate to the field of radio frequency identification (RFID) tags. In particular, embodiments of the invention relate to a system and method for using one or more RFID tags for orientation, tamper-evidence, and user privacy.

BACKGROUND OF THE INVENTION

Radio frequency identification (RFID) technology refers to passive smart tags (miniature antenna-containing tags requiring no internal power supply) that may be embedded in or attached to a product or material to convey information that may be read by a scanner. Generally, conductive or passive smart tags include a data circuit and an antenna. In particular, smart tags include a semiconductor, a coiled, etched, or stamped antenna, a capacitor, and a substrate on which the components are mounted or embedded. A protective covering is typically used to encapsulate and seal the substrate.

In general, RFID systems include readers and tags in which the tags generate an electromagnetic response to an electronic signal from a reader. The response signal is read by the reader, typically with a readable range on the order of a few feet, though broader or narrower ranges are possible. The signal generated by the tag includes information (e.g., an electronic product code) that identifies the tag or the article comprising the tag.

RFID tags are expected to become ubiquitous in future products, and are already being implemented in some supply chains for tracking products. However, existing systems do not use RFID tags to ensure the proper loading or orientation of products and packaging. There is a need for a system using RFID tags to detect the loading and orientation of products.

Further, a major roadblock to the commercial implementation of RFID technology has been consumer privacy. Public fears about the potential misuse of the information that could be obtained by tracking purchases with RFID have resulted in delays in several efforts to implement RFID. Standards for product tagging from the Auto-ID Center of the Massachusetts Institute of Technology call for chips to have a switch that can be activated by a code to kill the tag. Killing the tag generally refers to deactivating the microchip itself or at least removing or erasing a portion of the data stored in the tag (e.g., an electronic product code). However, killing the tag may eliminate all or some of the functionality and the benefits that can be obtained through RFID technology (e.g., consumer benefits such as automated registration of products, automated interactions of other articles with the purchased items, consumer tracking and cataloging of purchased articles using RFID systems, and automated safety systems). There is a need for systems and methods that deactivate an RFID tag mechanically and reversibly while retaining the consumer benefits associated with RFID technology.

Further, there have been many efforts to protect consumers from product tampering. To date, however, the onus for detecting tampering has generally been on the consumer who bears the responsibility for checking the integrity of containers or the presence of indications of tampering such as whether a pop-up section of a bottle lid has popped-up or not. Many consumers are not trained in detecting tampering or fail to recognize that an indicator for tampering has been activated. In some cases, a tamperer can simply remove the indicating device or indicia. In general, for most products, there have not been successful methods brought to the marketplace for automatically detecting tampering and eliminating tampered products before the product is sold to the consumer. Thus, there is a need for improved systems providing tamper-evident packaging with automated detection of tampering.

Some existing systems include RFID-enabled labels that can detect damage or removal of the label, as disclosed in U.S. patent application Ser. No. 2004/0066296 entitled "A Tamper Indicating Radio Frequency Identification Label with Tracking Capability" by Peter Atherton and assigned to Mikoh Corporation. This technology includes "COUNTERFOIL" smart labels that emit a signal when the labels are removed or broken. The labels have breakable conductive leads to RFID circuits. Tampering with the labels disables the RFID circuit or can be detected by circuitry that causes a particular code to be written to the RFID chip. For example, the use of RFID technology in this manner detects tampering with electricity meter boxes associated with electricity theft. The existing technology, however, is based on single RFID tag systems in labels in which the tag is permanently disabled by tampering or in which tampering causes a new code to be written to an expensive writable RFID tag. Accordingly, there is a need for systems and methods that use two or more RFID chips or two or more antennas to allow deactivation of one RFID signal and activation of another RFID signal to retain the consumer benefits of RFID technology.

SUMMARY OF THE INVENTION

In order to solve these and other needs in the art, the inventors hereof have succeeded at designing systems and methods for load sensing, orientation sensing, detection of product and package tampering, and user privacy with radio frequency identification (RFID) technology. Embodiments of the present invention include RFID tags that include a load-sensitive mechanical switch capable of enabling communication of a signal when a package is not properly oriented or when the package is not loaded with product. Thus, multifunctional RFID chips assist not only in tracking goods, but also in ensuring proper loading or orientation of products and packaging.

Other embodiments of the invention include RFID systems that detect product tampering and may be implemented directly in products or product packaging, as opposed to attachable labels, or in which a low cost passive read-only RFID tag is inactive until tampering occurs. Such systems allow automated detection of tampering and overcome some of the limitations of the prior art.

Still other embodiments of the invention include products and product packaging comprising permanent RFID tags associated with removable antennas to protect user privacy without removing the Electronic Product Code from a microchip.

In one form, a smart tag is responsive to an environmental condition. The smart tag includes a data circuit for storing identification information, an antenna for communicating a wireless signal, and a mechanical switch coupling the data circuit to the antenna. The environmental condition closes the mechanical switch to enable the data circuit and the antenna to communicate the identification information via the wireless signal.

In another form, a package has a radio frequency identification (RFID) tag attached thereto. The RFID tag is responsive to an environmental condition. The RFID tag includes an RFID chip for storing an RFID code, an antenna for communicating a radio frequency (RF) signal, and a mechanical switch coupling the RFID chip to the antenna. The environmental condition closes the mechanical switch to enable the RFID chip and the antenna to communicate the RFID code via the RF signal.

Alternatively, the invention may comprise various other methods and apparatuses.

Other features will be in part apparent and in part pointed out hereinafter.

BRIEF DESCRIPTION OF THE DRAWINGS AND TABLES

Corresponding reference characters indicate corresponding parts throughout the drawings.

DETAILED DESCRIPTION OF THE INVENTION

Figure 1:
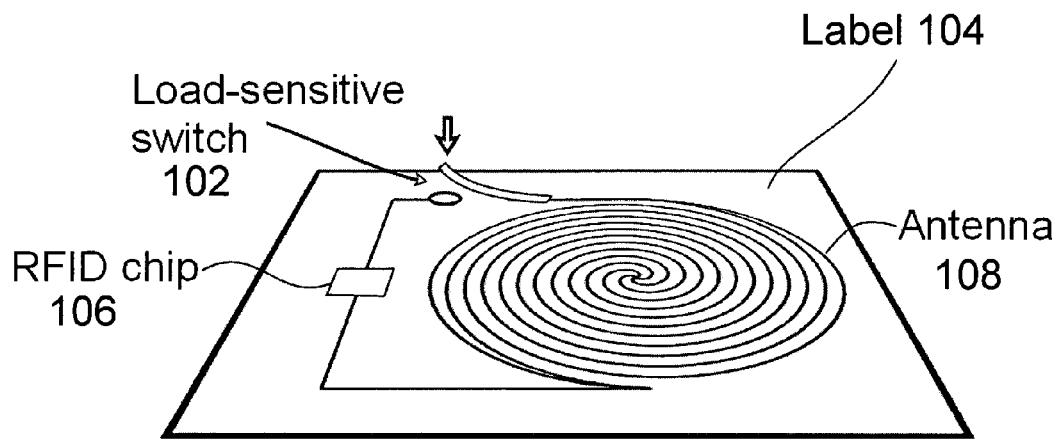
FIG. 1 illustrates an exemplary embodiment of a system according to an embodiment of the invention in which a load-sensitive switch joins a radio frequency identification (RFID) chip to an antenna.
Figure 2:
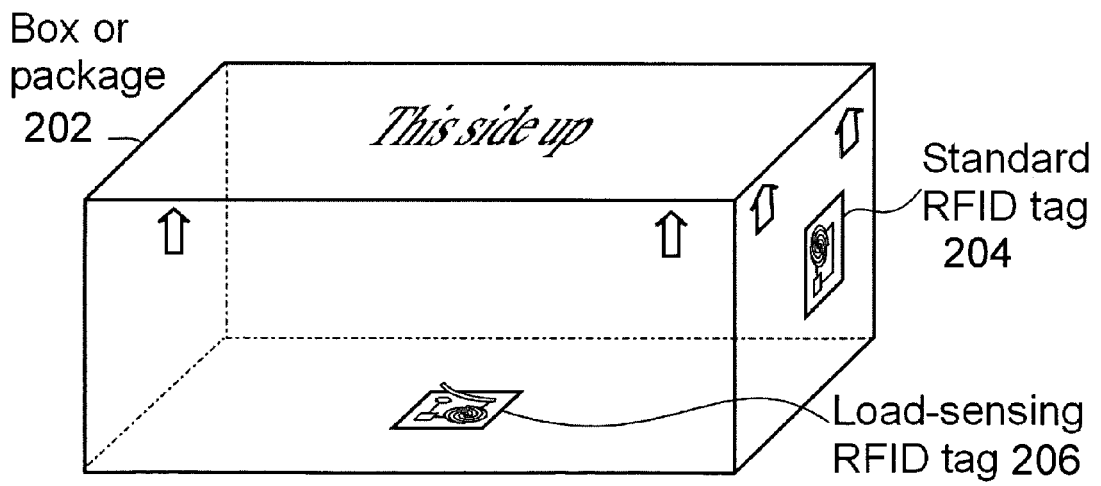
FIG. 2 is a diagram of an exemplary embodiment of a system according to an embodiment of the invention in which a box has a load-sensing RFID tag and a conventional RFID tag.
Figure 3:
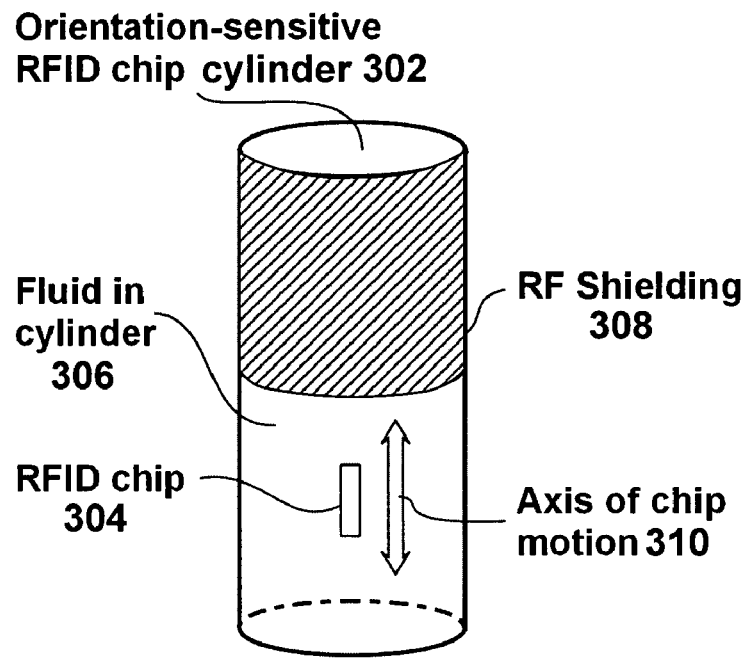
FIG. 3 is a diagram of an exemplary embodiment of a system according to an embodiment of the invention in which an RFID chip floats in a fluid-filled, partially RF-shielded container.
Figure 4:
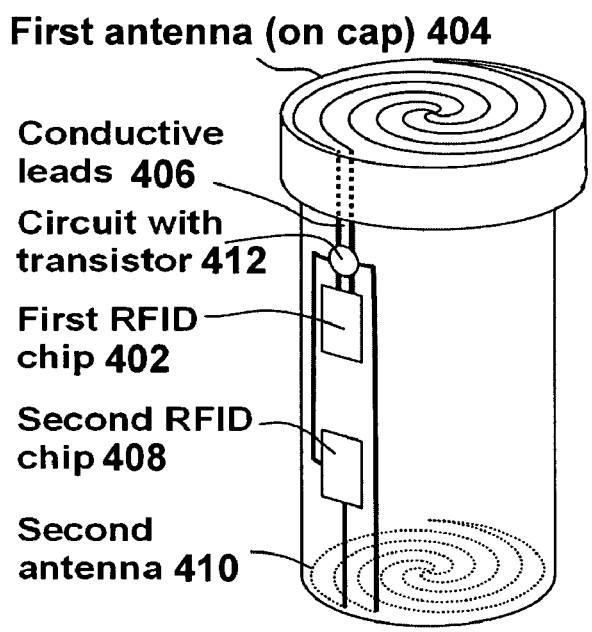
FIG. 4 is a diagram of an exemplary embodiment of a system according to an embodiment of the invention in which a container has two RFID chips for tamper detection.
Figure 5:
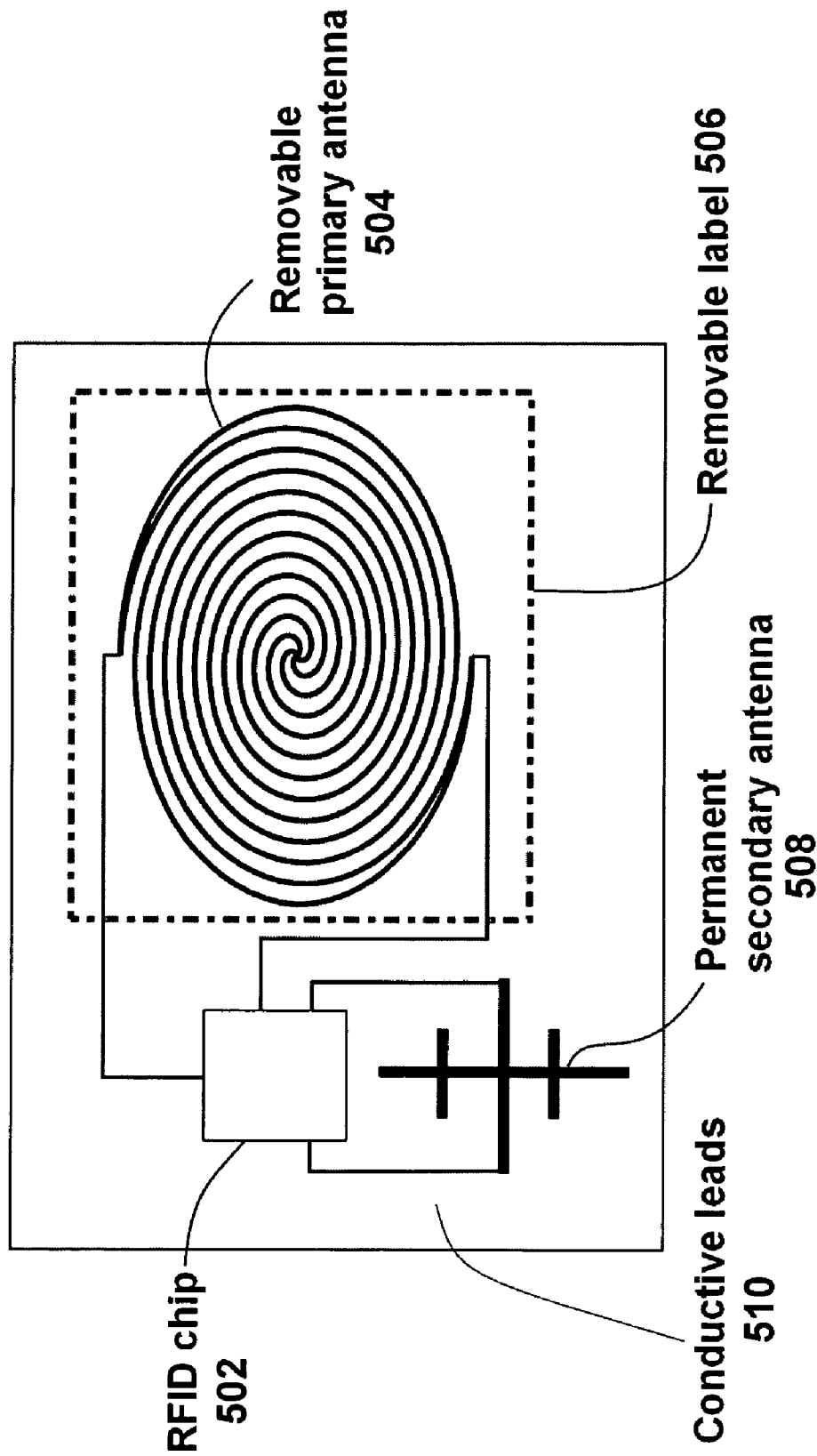
FIG. 5 is a diagram of an exemplary embodiment of a system according to an embodiment of the invention in which an RFID chip is attached to a permanent antenna and a removable antenna.
Figure 6:
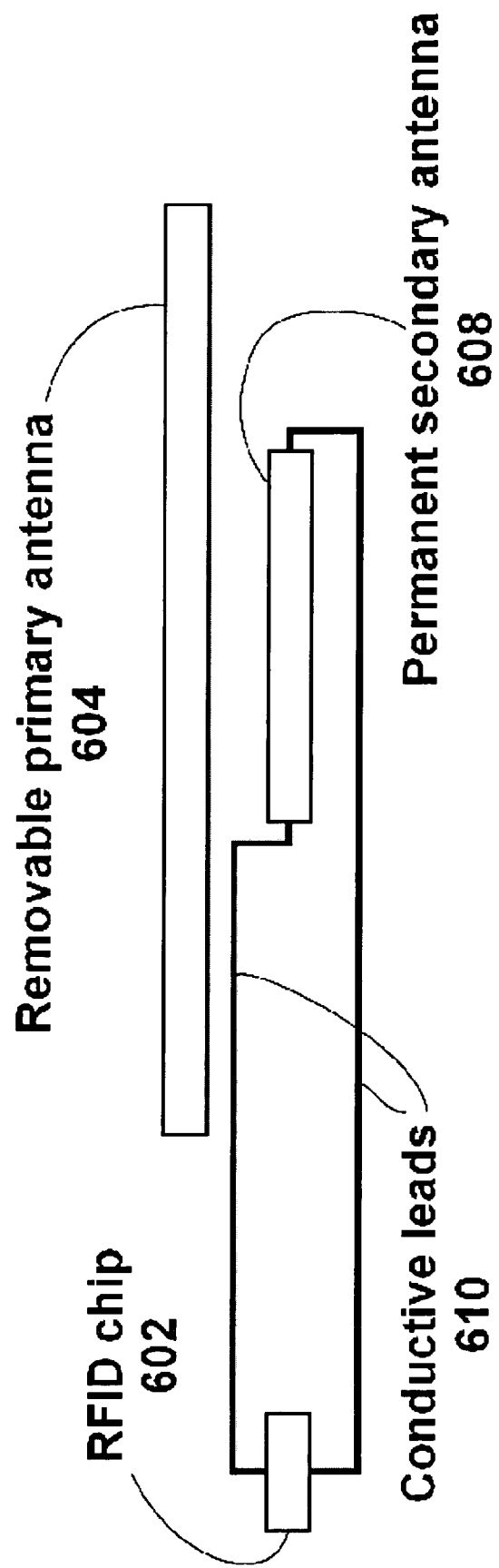
FIG. 6 is a diagram of an exemplary embodiment of a system in which an RFID chip is attached to a permanent antenna and cooperatively associated with, but not conductively attached to, a second removable antenna.

In one embodiment, the invention includes mechanically activating or deactivating a radio frequency identification (RFID) tag by load or orientation or user control. In particular, the invention includes a load-sensitive RFID circuit such as illustrated in FIG. 1 and FIG. 2, an orientation-sensitive RFID chip container such as illustrated in FIG. 3, a tamper-evident container with two RFID chips such as illustrated in FIG. 4, and an RFID tag with a removable antenna such as illustrated in FIG. 5. RFID chips may also be cooperatively associated with non-contacting removable antennas that provide energy via inductive coupling or resonance, as shown in FIG. 6.

Radio Frequency Identification (RFID)

RFID smart tag technology is known and understood by those skilled in the art, and a detailed explanation thereof is not necessary for purposes of describing the method and system according to the present invention. With RFID or other smart tag technology, a vendor may associate a unique identification code with a batch of raw materials, and enter physical property data into a database in which the data is associated with the identification code. When the raw material shipment is received at a manufacturing facility, an RFID scanner may automatically scan the RFID chip and retrieve the associated information from the database, verify that usable raw material has been received at the correct facility, provide quality information, and so forth.

RFID chips may be used to track products grouped in various hierarchies: (1) individual items or single packages containing multiple items for consumer purchase; (2) cartons or cases of multiple items; (3) pallets of multiple cartons or cases; and (4) loads (e.g., truckloads, shiploads, or railcar loads) of multiple pallets. The products at each of these levels may be assigned an RFID label that is associated with information pertaining to at least one adjacent hierarchical level. For example, an RFID label on a pallet may be associated in a database with the RFID labels for each carton on the pallet, or may be associated with data pertaining to the RFID label from the truckload.

RFID tags responsive to environmental conditions may be helpful in preventing improper storage and transport conditions, particularly for paper-based packaging materials such as corrugated board or paperboard which may be sensitive to moisture or may fail when improperly loaded or oriented. Proper condition monitoring of conditions experienced by packaging or by the contents of the packaging may be important, for example, for perishable items such as food, beverages, agricultural materials, dairy products, and biological materials such as bacteria, enzymes, microbes, live plants and plant samples, live animals or insects, etc. Hazardous and toxic materials may also benefit from improved monitoring of environmental conditions during storage and transport.

RFID tags of any known type may be used, including active RFID tags, passive RFID tags, and semi-passive RFID tags. Active RFID tags are battery-powered devices that transmit a signal to a reader and typically have long ranges such as 100 feet or more. Passive RFID tags are not battery powered but draw energy from electromagnetic waves from an RFID reader. Passive RFID tags often have a range of about 10 feet or less. Semi-passive RFID tags employ a battery to run the circuitry of a chip but rely on electromagnetic waves from a reader to power the transmitted signal.

Any of these chips may be read-only chips, which comprise a fixed electronic code, or they may be read-write chips, which allow new information to be added. The chips may also be associated with sensors to read sensor information and transmit a signal responsive to the information, such as a value from a biosensor. By way of example, principles for associated RFID or related wireless identification technology with sensors are described in U.S. Pat. No. 6,662,642, "Vehicle Wireless Sensing and Communication System," issued Dec. 16, 2003 to Breed et al., herein incorporated by reference, which also discusses methods for identifying the location of RFID chips.

Exemplary RFID tag manufacturers include Matrics, Alien Technology, Philips Semiconductor, and Texas Instruments. Manufacturing may be done by robotic techniques (e.g., "flip-chip"/"pick and place" techniques), fluidic self-assembly (FSA), the Philips "I-connect" method or the Philips "vibratory assembly" method, or other known processes. Exemplary RFID reader manufacturers include Intemec Technologies, Symbol Technologies, Matrics, AWID (e.g., their multi-protocol reader operate at various frequencies), and others. Software systems to support RFID systems are provided by IBM Global Services (which has acquired PriceWaterhouseCoopers), Texas Instruments, Manhattan Associates (particularly for integrated supply chain executions), SAP, and others. Printed RFID labels may be made using equipment from Zebra Technologies and other vendors.

An antenna may be made by any known method, including metal deposition, printing of conductive inks, etc. By way of example, the RFID tags may employ conductive ink technology of ROD Technologies (Bethlehem, Pa.) Antennas may be printed using any known format, and may, for example, comprise double-sided, interconnected coils. Any known frequency may be used, such as 100 kHz or 125 kHz ("low frequency"), 13.56 MHz ("high frequency"), 860–930 MHz such as 900 MHz or 915 MHz ("ultra high frequency" or UHF), and 2.45 GHz or 5.8 GHz (microwave frequency), or other known frequencies.

The RFID system may follow the systems disclosed by the MIT Auto-ID Center, including the use of an electronic product code (EPC); a Savant system to manage the codes being read with a distributed architecture and processes such as data smoothing, reader coordination, data forwarding, data storage, and task management; and Object Name Service (ONS) for matching EPC information to item information, typically using a domain name service (DNS) to route computers to Internet sites; and Physical Markup Language (PML) to describe information about a product.

Other vendors of integrated RFID systems or other tools for RFID include CheckPoint Systems, Tyco Sensormatic, Escort Memory Systems, Psion Teklogix (particularly for software systems to assist in logistics), SAMSys Technologies, Savi Technology, SCS Corporation, TAGSYS, ThingMagic LLC, and others. Supply-chain software may be provided by Crimson Software, Descartes Systems, EXE Technologies, Globe Ranger, Manhattan Associates, IBM Global Services, SAP, etc. These commercial systems are adaptable to track additional information provided by the sensors of the present invention, and to initiate corrective action in response to detected problems (e.g., missing load).

It is to be understood that many other technologies are equivalents for and/or have equivalence to the RFID embodiments disclosed herein. For example, RFID readers could be replaced with optical scanners, image analysis devices, arrays of chemical detection devices, and the like.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention. Exemplary SAW devices are disclosed in US Pat. Publication No. US20030111540A1, "Surface Acoustic Wave Identification Tag Having Enhanced Data Content and Methods of Operation and Manufacture Thereof," published Jun. 16, 2003, by Hartmann.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses which cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

RFID Tags as Load Sensors or Orientation Sensors

Referring first to FIG. 1, an exemplary embodiment of a system according to an embodiment of the invention includes a data tag capable of being mechanically and reversibly deactivated by load or orientation or user control. In a particular embodiment, the invention includes improved RFID tags that comprise a load-sensitive mechanical switch 102 capable of enabling communication of a signal when a package is not properly oriented or when the package is not loaded with product. The load-sensitive switch includes dome-like switches or other known load-sensitive devices. However, user-activated on-off switching of RFID circuits may be done in any known manner.

Alternatively, in one embodiment, the switches of the present invention exclude those that can readily be operated by a human finger, but instead may be positioned such that finger contact cannot readily operate the switches, or may require loads greater than can be easily applied by a finger (e.g., greater than about 10 pounds or greater than about 30 pounds). In one alternative embodiment, the system does not rely on a pressure-sensitive mechanical switch, but employs other mechanisms disclosed herein.

FIG. 1 shows an example of an RFID label 104 in which a load sensitive switch 102 joins an RFID chip 106 to an antenna 108. When a load depresses the switch 102, the RFID label 104 is enabled such that the information in the chip 106 is transmitted by the antenna 108 in response to scanning by an RFID reader at a suitable frequency. When the load is removed, the RFID chip 106 cannot be read by a conventional reader because of an inadequate response signal. In one embodiment, the switch 102 is a mechanical switch. Closing and opening the switch 102 activates and deactivates, respectively, the RFID chip 106 and the antenna 108. Alternatively, closing and opening the switch 102 deactivates and activates, respectively, the RFID chip 106 and the antenna 108. Activating the RFID chip 106 and the antenna 108 enables the RFID chip 106 and the antenna 108 to communicate (e.g., transmit or receive) data (e.g., to a scanner or reader or interrogator). Communicating data, in one embodiment, includes transmitting or receiving one or more RFID codes or other identification information via one or more RF signals.

Referring next to FIG. 2, an exemplary embodiment of a system according to an embodiment of the invention includes a box 202 with two RFID tags 204, 206. A load-sensing tag 206 on the bottom of the box 202 is enabled when the load-sensitive switch is depressed by the load applied by the contents of the box 202 when the box 202 is in the proper orientation. If the box 202 is inverted, the items in the box 202 no longer depress the load-sensitive RFID tag 206, causing the load-sensitive RFID tag 206 to be disabled. A second RFID tag 204 (e.g., a conventional RFID tag) is shown mounted on a side of the box 202. The second RFID tag 204 is not load sensitive and transmits identifying information regardless of the orientation of the box 202.

Alternatively, the second RFID tag 204 may be mounted on the top of a box (not shown) and further may be load sensitive, such that the second RFID tag 204 operates to indicate crushing or excessive loading of a box by other items placed on top of it. The presence of a load above a predetermined threshold activates or inactivates the second RFID tag 204, as desired, by properly configuring the switch and the associated circuitry.

In other embodiments, a micro electro mechanical system (MEMS) device or the like serving as an orientation detector could be associated with an RFID circuit or label. A MEMS device, for example, could include a miniature gravity-sensitive circuit, such as a box with a small, unattached conductive plate or ball in it that allows gravity to pull the plate or ball into contact with conductive leads when the box is in a predetermined orientation; otherwise, the circuit remains open. Thus, a miniature orientation sensor allows an RFID tag to generate a signal only when the label is in a predetermined orientation. Such an orientation sensor could be operated in addition to or in series with a load sensor. When the orientation sensor is in series with a load-sensitive switch, the RFID signal is blocked (or greatly diminished) when either the load is absent or the orientation is wrong. Alternatively or in addition, when the orientation sensor and the load sensor are in the same circuit, a first RF signal is generated with a first RFID code from the load-sensitive circuit, and a second RF signal is generated with a second RFID code from the orientation-sensitive circuit.

In another embodiment, a MEMS gravity-sensitive switch or a load-sensitive switch toggles between two circuits with two different RFID tags, such that when there is a load present or when the proper orientation exists, respectively, an RFID scanner will read a signal from a first RFID tag, which indicates that the container is in a state having a load or the proper orientation, respectively. When the load is not present or the orientation is improper, a second RFID tag is active and the first tag is inactive. In this manner, scanning a package would read a signal from one of two RFID tags that provides information about which of two states the package is in. Multiple sets of these toggling pairs of RFID tags could be used to assess both the load state and orientation state, as well as other states. For example, MEMS accelerometers may also be used to trigger theft detection. Alternatively, both tags may be active or inactive as a function of conditions experienced by the container.

The RFID tags 204, 206 may independently be integral with the container or with packaging material for individual products. The RFID tags 204, 206 may be fixedly attached to the container or packaging in a substantially permanent manner (e.g., by adhesive means, sandwiching between adhesively joined layers, or embedding), or may be removably attached.

In one embodiment, the user-activated switch is a gravity-activated device in which the RFID chip is only scannable when the object is held in a predetermined orientation. One embodiment is shown in FIG. 3, which depicts a small fluid-filled cylinder 302 or other container in which an RFID chip 304 (with integral antenna) of higher or lower density than the fluid 306 is able to sink (or float) into an RF-accessible portion of the cylinder 302 when the cylinder 302 is properly aligned, but wherein inverting the cylinder 302 causes the RFID chip 304 to move along an axis of chip motion 310 into a shielded portion of the cylinder 302 such that the RFID chip 304 may no longer be scanned due to RF shielding 308 on the cylinder 302. The fluid may be, by way of example, an oil, water, an alcohol, a glycol, a silicone compound or other liquids, or may be air or other gases. In one embodiment, the shielding 308 is constructed of ferrite or other suitable shielding material (e.g., a soft, magnetic alloy with a high initial and maximum magnetic permeability). Such vials could be on the order of a few millimeters in length and could be readily embedded in plastic components of a product or adhesively attached to an interior portion of a product. Depending on the size of the antenna that is attached to the chip 304, the range of the RFID chip 304 may be short enough to prevent unauthorized scanning.

Alternatively or in addition, the RF shielding 308 is capable of movement relative to the cylinder 302 and to the RFID chip 304. The movement of the RF shielding 308 may be related to or independent of the movement of the RFID chip 304. In another embodiment, the location of the RFID chip 304 relative to the cylinder 302 is fixed while the RF shielding 308 is capable of movement relative to the fixed RFID chip 304 to enable and disable communication by the RFID chip 304.

In another embodiment, two or more conventional RFID tags with distinct RFID codes are mounted on two or more opposing surfaces of a package or box to enable triangulation or proximity detection methods to be applied to determine the orientation of the box. Triangulation with RFID and related principles are disclosed in US Pat. Publication No. 20040036595, "Object Tracking," published Feb. 26, 2004, by Kenny et al., herein incorporated by reference. Two or more scanners are operatively associated to perform RFID triangulation, allowing the system to determine which of the RFID tags on the box is most elevated. Alternatively, a single RFID scanner (including a "smart shelf") is used to determine which RFID tag is closest to it based either on the delay time for a signal or by varying the strength of the emitted signal and determining which of two or more RFID tags on a package is the first to be read as the scanning signal power ramps from low to high levels. The first RFID tag to emit a readable signal in response typically may be presumed to be the most proximate. This knowledge may then be used to determine the orientation of the package.

Other states that could be probed with RFID technology using the architecture of FIG. 1 include environmental conditions such as the humidity and temperature of the package or container. An RFID-responsive antenna could be connected to an RFID chip with a sensor such as a temperature-sensitive or humidity-sensitive adhesive or connection, such that exposure to an inappropriately high temperature or humidity could trigger release of the adhesive and thus open the circuit. Alternatively, a switch element could move or deflect between two positions as a function of temperature or humidity, allowing a switch to toggle between two RFID circuits such that the RFID code read by a scanner could identify which of two states the container was in. More complex circuits could be devised to cover multiple temperature ranges, load ranges, and the like, with multiple RFID chips that could be read depending on the state of the container. A single label could include one or more toggling RFID circuits or a plurality of RFID tags enabled to detect a plurality of states (load, orientation, moisture, etc.) . For example, a single package, carton, or case includes multiple RFID chips in toggling circuits for reading in one pass to obtain details such as whether the package has a load, whether the package is at a humidity above 50%, and/or whether the package is upside down. The information obtained from the package may interface with a customer's quality control system. Such temperature and humidity sensors are known in the art. For example, see U.S. Pat. No. 6,294,997 entitled "RFID Tag Having Timing and Environment Modules" by Paratore et al.

Further, the switch illustrated in FIG. 1 may also be any element that has at least two modes. For example, various mode pairs may include on and off, open and closed, transmitting and non-transmitting, a detectable transmission and a non-detectable transmission (e.g., via shielding), and a value above a threshold and a value below a threshold.

RFID for Tamper-evident Packaging

The invention also includes RFID systems to detect product tampering. These RFID systems include a low cost passive read-only RFID tag that is inactive until tampering occurs. Embodiments of the invention may be implemented directly in products, product packaging, or attachable labels.

In one example (not shown), a tamper-evident bottle or other container is shown in which a single RFID chip is attached to the bottle (e.g., embedded in the plastic of the bottle itself or adhesively attached to a surface, such as an interior surface where removal would be difficult), and an antenna is attached to the cap or other closure of the bottle. The RFID chip is connected to the antenna with delicate conductive leads (e.g., micro printed conductive lines) to form a tamper evident seal that is broken when the bottle is opened. The leads may run to the inner surface of the cap, or may join to an exterior portion of the cap. The leads are printed conductive inks or other materials. Tampering with a package (e.g., removing the cap) breaks the continuity of the conductive pathway between an RFID chip and an antenna, such that the chip is deactivated and no longer scannable. That is, when the cap is removed, the leads are broken and the RFID chip is deactivated. Bottles that fail to return an RFID signal are rejected. For example, during checkout or during inventory inspection, bottles are scanned to ensure that the RFID system is intact.

Conductive leads as well as the conductive materials in an antenna may be manufactured by any known technique, including the methods disclosed in U.S. Pat. Publication US20020152605A1, "Method and System for Forming RF Reflective Pathways," published Oct. 24, 2002 by Debraal, and WO 2002/086910A2, "A Method and System for Forming Electrically Conductive Pathways," published Oct. 31, 2002 by Debraal, both of which are herein incorporated by reference.

FIG. 4 illustrates a bottle having a first RFID chip 402 attached to a first antenna 404 via conductive leads 406. Breaking the first circuit (e.g., breaking conductive leads 406) closes a separate alert circuit via a circuit with a transistor 412 that activates a second RFID chip 408 and antenna 410 to provide a positive indication of tampering that is readily detected by scanning. The second RFID chip 408 and antenna 410 may be embedded in or attached to the bottle to facilitate automatic detection of tampering. The code in the second RFID 408 chip is detectable whenever the bottle is scanned. In one embodiment, if the bottle has not been tampered with, the two RFID chips 402, 408 are scanned, yielding a first code and a second code which are known to belong together. If only one code is found instead of two, the bottle is rejected. Rapid scanning of many bottles at once allows a computer to compare the list of first RFID chips 402 from each bottle with the list of second RFID chips 408 from each bottle, to determine if some bottles do not have the second RFID chip 408 that is paired with the first chip 402, allowing automatic detection of the presence of a tampered bottle in the scanned group.

The alert circuit may include a plurality of transistors and other components, and may comprise any known flip flop circuit, relays, or other systems that can switch the active pathways of the RFID circuits such that only one of the two RFID chips is active, depending on the state of the system.

In another embodiment, two or more chips and two or more antennas are combined in a circuit comprising a transistor. A first chip is active when the leads to the antenna in the cap are in place. Voltage from the antenna in the cap is applied to a circuit comprising at least one transistor to open or close a switch, such that when the first chip is active, the circuit for a second chip is inactive, but when the connection to the antenna in the cap is broken (e.g., due to tampering) and no voltage from RF energy is applied to the switching circuit during an RFID scan, then a second circuit is active in which a second RFID chip is connected to a second antenna. Thus depending on whether RF power from the first antenna in the lid is available or not, a switching circuit determines whether a first or second RFID chip is read during an RFID scan. The second chip may have a code that is recognized as an alarm indication. In this manner, an alarm signal is issued by a second RFID chip to facilitate detection of tampered product alternatively or in addition to detecting the absence of an RFID signal as an indication of tampering. Using two chips in this redundant manner improves the reliability of the tamper detection. Further, using two RFID chips instead of one RFID chip simplifies the circuitry in some implementations.

In other embodiments, the first RFID chip is removable such that no RFID signal is generated unless the power from the first antenna in the lid is not present during a scan, thereby enabling activation of the circuit for an RFID alarm chip (the second chip in FIG. 4).

In other embodiments, active RFID chips with microbatteries (e.g., the flexible batteries of PowerPaper Ltd. of Einat, Israel) are used, such that when there is tampering, a switch is activated that connects the battery to the chip and issues an alarm signal that is immediately detected.

In related embodiments, a circuit may be disrupted by opening a box, removing a label, penetrating the wall of a container, slicing a film, etc. In some cases the packaging may be designed such that opening or cutting a package brings two conductive materials into contact to close a circuit and enable an RFID scanner to read an alert signal.

One embodiment of the present invention includes a system comprising a container and a closure and at least two RFID chips having distinct codes, each RFID chip being associated with its own circuit, wherein only one of the at least two RFID chips is active at a time (e.g., to be easily read by a suitable scanner). First and second circuits for a first and second RFID chip, respectively, may include some common elements, such as a shared transistor, capacitor, resistor, conductive leads, etc., but at least one component of each circuit is not shared and is associated with either the container or closure, such that opening the closure, removing the closure, or changing the position of the closure relative to the container (e.g., moving the container a predetermined effective distance) toggles the circuits so that an active RFID circuit becomes inactive and an inactive circuit becomes active.

The container can comprise cardboard, paper, plastic, metal, wood, leather, rubber, glass, and the like, and may be in the form of a box, a disposable package, a pallet, a crate, a mechanical dispenser, a plastic bag, a product package comprising at least one of plastic, paper, and metal, and so forth. The container may be cylindrical, rectangular, ellipsoidal, spherical, or any other shape. The closure may be a cap such as a screw-on or snap-on cap, a cover, a panel, a hinged element, etc. The closure may be completely removable or may remain attached to the container when opened, with attachment means including a tether, a string, a chain, a hinge, an extensible element, a flexible strip, etc. Exemplary combinations of containers and closures include plastic pill bottles and child-proof caps, glass jars and screw-on metal lids, tin cans and removable lids, gas tanks and gas tank caps, shoe boxes and removable lids, cardboard boxes and flaps, and the like.

Products with RFID Tag Systems that Protect User Privacy

The invention also includes products and product packaging comprising permanent RFID tags associated with removable antennas to protect user privacy without removing an electronic product code (EPC) or other data from the tag.

Generally, the ability of third parties to scan RFID tags in consumer products depends on the RFID tags being connected with a suitable antenna to provide an adequate read range for scanners. Conventional-sized antennas provide significant scan ranges, with typical ranges of two to twenty feet for systems being proposed for consumer products. In one embodiment, the RFID tag is associated with a first removable antenna suitable for commercial applications (inventory scanning, automated checkout, product location, etc.), and a second small antenna with a relatively smaller read range such as less than two feet or less than six inches. The first antenna may be physically attached to removable packaging or to a removable label or tab on the product, allowing the purchaser to deactivate conventional scanning by removing the antenna, but retaining functionality of the chip for close-range scanning should the consumer wish to have the product ID read. Alternatively or in combination with a small read range, the second antenna may be shielded to prevent scanning unless a protective structure (e.g., a foil casing) is removed or opened, or may have a mechanical switch activated by a deliberate action (e.g., a fail-open switch on the product for depression by a finger to close the circuit and enable use of the small antenna). For a given RFID reader operating on the system, the ratio of the read range after removal of the first antenna to the read range prior to removal of the first antenna may be less than about any of the following: 0.5, 0.2, 0.1, 0.05, 0.01, and 0.005.

Alternatively, the signal strength returned by the system when being scanned by a given RFID reader at a given location relative to the RFID tag is substantially less after removal of the first antenna. The ratio of the returned signal strength after removal to the signal strength before removal as measured with a conventional RFID reader of suitable frequency (e.g., 13.56 MHz or 915 MHz) at optimum orientation and a distance of 6 inches may be less than about any of the following: 0.5, 0.2, 0.1, 0.05, 0.01, and 0.005. Similar results may be obtained for other distances, such as 2 inches, 24 inches, and 10 feet.

One embodiment is shown in FIG. 5. A RFID chip 502 containing an EPC is connected to a large primary antenna 504 that is removable, being attached to a removable label 506 with conductive leads that may be readily broken when the removable label 506 is removed. The RFID chip 502 is also attached to a small permanent secondary antenna 508. The removable label 506 may be a price tag, a removable Electronic Article Surveillance (EAS) tag, a plastic tab that may be broken or torn off, a cloth product label, an insert in the product such as a cardboard support element in the collar of a shirt, or it may be part of the packaging (i.e., the removable primary antenna may be attached to a cardboard package encasing the product or to a film wrapping the product, while the RFID chip 502 is embedded within the product itself) . The conductive leads joining the removable antenna 504 with the RFID chip 502 may be fully or partly removed when the removable label 506 is removed, or may remain on the product. The leads may be metal wires, printed conductive inks, conductive polymers, and the like. The removable label 506 or associated product packaging may be provided with indicia instructing the user to remove the label 506 after purchase, and optionally informing the user that the primary RFID antenna 504 will be removed when the removable label 506 is removed. A capacitor or other electronic components may be associated with the secondary antenna 508 and/or the primary antenna 504.

In another embodiment (not shown), the RFID chip 502 is attached to the permanent secondary antenna 508 with a switch responsive to conscious action by the user to activate the circuit and enable RFID scanning. In this case, a load-sensitive switch is provided, which may be in the form of a bubble switch such as those used in electronic devices (keyboards, etc., to close a circuit and send a signal in response to a touch or finger depression from a user). The switch remains open unless depressed, and when open, the RFID chip 502 is not connected to the antenna 508, making the chip 502 substantially unreadable during a scan. In such embodiments, the permanent antenna 504 need not be small, since the user controls whether scanning is possible or not, but may be adapted to provide a small range (e.g., less than three feet or less than one foot) is desired.

FIG. 6 shows a related embodiment in which an RFID chip 602 is joined by conductive leads 610 to a permanent secondary antenna 608, and is cooperatively associated with a removable primary antenna 604 that is not directly connected to the RFID chip 602 by conductive leads, but rather is inductively coupled to secondary antenna 608. A capacitor or other electronic components may be associated with the secondary antenna 608 and/or the primary antenna 604. Principles for such "non-contacting" electrical communication between two antennas are disclosed in U.S. Pat. No. 6,680,702, "Radio Frequency Resonant Tags with Conducting Patterns Connected Via a Dielectric Film," issued Jan. 20, 2004 to Yde-Andersen et al., herein incorporated by reference. The Yde-Andersen patent describes radio frequency resonant tags wherein radio frequency energy is transmitted through a resonance circuit without the need for direct connection of a conducting pattern or conducting patterns, but rather via a dielectric film which is adjacent to the conducting pattern or separates the conducting patterns. A related system is described in EP 1225585 A1, "CD Comprising a Transponder and a CD-Box Comprising a Resonance Circuit," published July 24, 2002 by Esch and Lucas. In this system, a transponder circuit comprising a relatively large coil and a capacitor is tuned to or near the frequency of an identification and antitheft system such that it is coupled without direct electrical contact, permitting a radio frequency transmitting/receiving system to read information from the identification system over a greater distance than would be possible without the coupled transponder system.

Regarding the embodiments in FIG. 5 and FIG. 6, and related embodiments with one or more removable antennas associated with an RFID tag, the RFID tag may be attached to a container that holds products or other materials, or it may be attached to a product within a container. The removable antenna may be attached to a product itself within a container, or to a container. In one embodiment, both the RFID tag and the removable antenna are attached to a container and not to the product or materials within the container, such that the product or materials within the container may be readily separated from the RFID tag by a consumer who has purchased the product or by another party. In one embodiment, deactivation of the removable antenna occurs by physically removing the removable antenna from the container to which it is attached without removing the RFID tag from its location on or within the container. In another embodiment, a permanent secondary antenna and a primary removable antenna are both attached to the same container, or to the same product, or to an external surface of an object, or to the same surface or panel of an object.

Remarks

According to the present invention, two or more RFID chips may be associated with a product, and these chips may be associated with one or more antennas, including a removable antenna which may be associated with one or more of the chips.

In another embodiment, the purchaser selectively deactivates a permanent RFID tag that remains with the product to temporarily prevent scanning. For example, a switch that is closed by default, providing an active RFID circuit, could be opened by application of pressure or flipping a toggle switch to open the circuit and prevent scanning.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A smart tag responsive to an environmental condition, said smart tag comprising:
   a data circuit for storing identification information;
   an antenna for communicating a wireless signal; and
   a mechanical switch coupling the data circuit to the antenna, wherein the environmental condition closes the mechanical switch to enable the data circuit and the antenna to communicate the identification information via the wireless signal.

2. The smart tag of claim 1, wherein the mechanical switch has at least two modes, and further comprising a sensor for selecting one of the at least two modes as a function of the environmental condition.

3. The smart tag of claim 2, wherein the sensor comprises one or more of the following: a load sensor, a temperature sensor, a humidity sensor, and an orientation sensor.

4. The smart tag of claim 1, wherein the environmental condition comprises one or more of the following: a load, temperature, humidity, and orientation of the smart tag.

5. The smart tag of claim 1, wherein the mechanical switch comprises a micro electro mechanical system device having a gravity-sensitive circuit.

6. The smart tag of claim 1, wherein the data circuit, antenna, and mechanical switch represent an electronic article surveillance tag.

7. The smart tag of claim 1, wherein the data circuit for storing the identification information comprises a radio frequency identification (RFID) chip for storing an RFID code, and wherein the antenna for communicating the wireless signal comprises an antenna for communicating a radio frequency (RF) signal.

8. The smart tag of claim 7, wherein the mechanical switch coupling the data circuit to the antenna comprises a mechanical switch coupling the RFID chip to the antenna, wherein the environmental condition closes the mechanical switch to enable the RFID chip and the antenna to communicate the RFID code via the RF signal.

9. The smart tag of claim 8, wherein the environmental condition closes the mechanical switch to enable the RFID chip and the antenna to transmit the RFID code via the RF signal.

10. The smart tag of claim 8, wherein the environmental condition closes the mechanical switch to enable the RFID chip and the antenna to receive the RFID code via the RF signal.

11. The smart tag of claim 8, wherein the environmental condition opens the mechanical switch to prevent the RFID chip and the antenna from communicating the RFID code via the RF signal.

12. The smart tag of claim 8, wherein the environmental condition closes the mechanical switch to enable the RFID chip and the antenna to receive another RFID code via the RF signal.

13. The smart tag of claim 8, wherein the environmental condition closes the mechanical switch to enable the RFID chip and the antenna to receive another RFID code via another RF signal.

14. The smart tag of claim 8, wherein the mechanical switch comprises a load-sensitive circuit and an orientation-sensitive circuit, wherein the load-sensitive circuit generates a first RF signal with a first RFID code, and wherein the orientation-sensitive circuit generates a second RF signal with a second RFID code.

15. The smart tag of claim 8, wherein the antenna comprises a first antenna, and further comprising a second antenna attached to the RFID chip.

16. The smart tag of claim 15, wherein the first antenna is a long-range antenna, and the second antenna is a short-range antenna.

17. The smart tag of claim 8, wherein the RFID chip comprises a first RFID chip, and further comprising a second RFID chip, wherein the mechanical switch couples the second RFID chip to the antenna, and wherein the environmental condition toggles the mechanical switch to disable the first RFID chip and enable the second RFID chip.

18. The smart tag of claim 8, wherein the environmental condition closes the mechanical switch as a function of a physical load to activate the RFID chip and the antenna to transmit the RFID code via the RF signal.

19. A package having a radio frequency identification (RFID) tag attached thereto, said RFID tag being responsive to an environmental condition, said RFID tag comprising:
   an RFID chip for storing an RFID code;
   an antenna for communicating a radio frequency (RF) signal; and
   a mechanical switch coupling the RFID chip to the antenna, wherein the environmental condition closes the mechanical switch to enable the RFID chip and the antenna to communicate the RFID code via the RF signal.

20. The package of claim 19, wherein the package comprises paperboard or corrugated board.

21. The package of claim 19, wherein the package comprises perishable material.

* * * * *